Patented Nov. 4, 1952

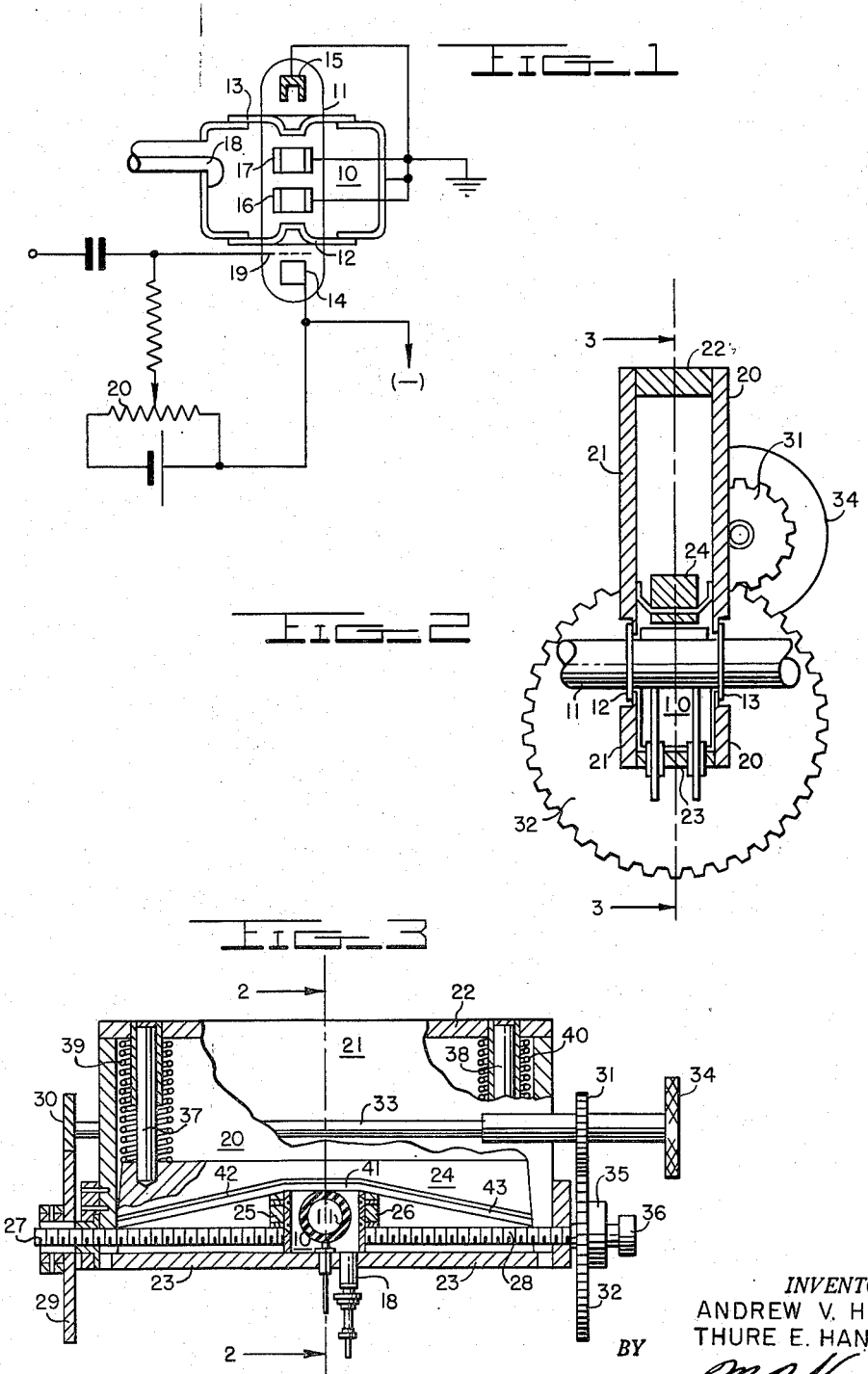

2,616,966

UNITED STATES PATENT OFFICE 2,616,966

VARIABLE CAVITY RESONATOR

Andrew V. Haeff, Washington, D. C., and Thure E. Hanley, Temple Hills, Md.

Original application January 11, 1946, Serial No. 640,636. Divided and this application July 30, 1948, Serial No. 41,644

8 Claims. (Cl. 178—44)

(Granted under the act of March 3, 1883, as amended April 30, 1928; 370 O. G. 757)

This application is a division of application Serial No. 640,636, filed January 11, 1946, now Patent No. 2,589,248.

This invention relates to electrical signal generators and more particularly to high frequency generators adapted to operate in a microwave region.

In the microwave regions of the frequency spectrums, oscillation generators are frequently employed in which a resonant cavity structure functions as a frequency determining element for a source of oscillation energy, typically a velocity modulation electron tube. In such an oscillation generator, energy is supplied to the resonant cavity structure at the resonant frequency thereof, or at a frequency bearing some harmonic relationship to the resonant frequency. In the oscillator structures heretofore available, it was not possible to tune the resonant cavity to produce sustained oscillations at any particular frequency throughout a wide band of frequencies simply by the alteration of a single cavity dimension because, at certain frequency points in the wide band, effects existed which prevented operation entirely or which rendered operation unsatisfactory because of low output, for example.

Accordingly, it is an object of the present invention to provide an oscillation generating system employing a cavity resonator as a frequency selective element which is tunable to any particular frequency over a wide band of frequencies without unsatisfactory operation occurring at any frequency in the band.

Another object is to provide a cavity resonator constructed in such a manner so that two dimensions thereof may be simultaneously adjusted to control the resonant frequency thereof.

Still another object of the present invention is to provide a cavity resonator of substantially rectangular cross section in which the width and length dimensions thereof may be simultaneously adjusted to control the resonant frequency.

Other objects and features of the present invention will become apparent upon consideration of the following detailed description in connection with the accompanying drawing which illustrates one embodiment of the invention. It is to be expressly understood, however, that the drawing is designed for purposes of illustration only and not as a definition of the limits of the invention, reference for the latter purpose being had to the appended claims.

In the drawing, wherein similar reference characters denote similar elements throughout the similar views:

Fig. 1 is a schematic drawing of a velocity modulation oscillator employing a resonant cavity as a frequency selective element;

Fig. 2 is a sectional illustration of an oscillator and cavity assembly constructed in accordance with the principles of the present invention, and Fig. 3 is a sectional illustration through line 3—3 of Fig. 2.

According to the fundamental concepts of the present invention, an oscillator assembly employing a velocity modulation tube and a resonant cavity is rendered tunable to any particular frequency in a wide frequency band by simultaneous alteration of two dimensions of the resonant cavity and by controlling the potential applied to an element or elements of the velocity modulation tube.

A schematic illustration of a resonant cavity velocity modulated high frequency signal generator is depicted in Fig. 1. The generator includes a resonant cavity 10 formed partly within and partly without the glass envelope of tube 11, connections between the inner and outer parts of the cavity being made through annular conductive rings 12 and 13 sealed to the glass walls of the tube 11. Electrons emitted by the cathode structure 14 of the tube 11 travel in the direction of electrode 15 maintained at a voltage positive with respect to the voltage of the cathode structure 14. In their passage from the cathode structure 14 to the positive electrode 15, the electrons are subjected to various fields from the cylindrical electrodes 16 and 17, and the annular rings 12 and 13. The combined action of the foregoing fields concentrates the electrons into a small diameter beam and transfers a part of the beam energy to the resonant cavity 10. The oscillation generator functions in a manner similar to conventional velocity modulation oscillators with electron bunching taking place in the so-called "drift space" between the rings 12 and 13 to produce and sustain oscillations. A part of the energy generated within the oscillator is supplied to an external power consuming device, not shown, by means of an output coupling arrangement and coaxial transmission line 18.

Provision is made in the oscillator generator for modulating the output signal by a beam control electrode or grid structure 19. By adjustment of the potential difference existing between the grid structure 19 and the cathode 14, by means of potentiometer 20, the number of electrons travelling from the cathode 14 to the electrode 15 may be controlled to alter the amplitude of the oscillatory field within the resonant cavity 10 and hence the amplitude of the output signal.

The frequency of the output signal is determined primarily by the dimensions of the cavity 10 and the potential difference existing between the elements 14 and 15 of the tube 11, because either factor will alter the bunching of electrons which occurs in passage thereof between the annular rings 12 and 13.

A sectional view of a resonant cavity embodying the principles of the present invention is shown in Fig. 2. The resonant cavity is constructed around the oscillator tube 11 and comprises an outer cavity bounded in the plane of Fig. 2 by plates 20, 21, 22 and 23, and by the annular rings 12 and 13. A slidable assembly 24 divides the outer cavity to form a variable size resonant cavity for the high frequency oscillator bounded by the plates 20, 21 and 23, the annular rings 12 and 13, and the slidable assembly 24.

Construction of the resonant cavity structure which allows simultaneous adjustment of two dimensions thereof will be more fully understood with reference to Fig. 3 of the drawing. As shown, the resonant cavity is further bounded in the plane of the figure by slidable wall members 25 and 26. The members 25 and 26 are positionally variable and may be moved in opposite directions, either simultaneously or separably, by means of threaded shafts 27 and 28, respectively. The shafts 27 and 28 are tunable simultaneously through gearing 29, 30, 31 and 32, and a countershaft 33. The shaft 33 may be rotated directly by control knob 34, or indirectly through other shaft members if desired for convenience of adjustment. When it is desired to position the members 25 and 26 individually, a clutch device 35 is operated to disconnect the gear 32 from the shaft 28, and the latter shaft is then rotatable independently of the shaft 27 by a control knob 36. The lower surface of the assembly 24 rests upon the upper surface of the slidable members 25 and 26 as shown in the drawing, and is held in the position disclosed by guide members 37 and 38 and associated springs 39 and 40. The assembly 24 is provided with a central portion 41 having a lower surface substantially perpendicular to the slidable members 25 and 26, and with two outer portions 42 and 43 inclined in opposite directions toward the plate 23. With this arrangement, motion of the members 25 and 26 away from the tube 11 effects an upward motion of the assembly 24 to simultaneously alter the cavity dimension between the assembly 24 and the bottom plate 23 and between the members 25 and 26. Similarly, motion of the members 25 and 26 toward the tube 11 effects a two dimensional simultaneous reduction in the size of the resonant cavity structure.

There is thus provided by the present invention as oscillation generator employing a cavity resonator as a frequency selective element thereof with the cavity resonator constructed in such a manner so that two dimensions thereof may be simultaneously adjusted to determine the resonant frequency thereof. An oscillator generator including a cavity resonator embodying the principles of the present invention is capable of providing sustained oscillations at any particular frequency throughout a wide band of frequencies without disadvantageously effecting operation of the generator.

Although only one embodiment of the present invention has been disclosed and described herein it is to be expressly understood that various changes and substitutions may be made therein without departing from the spirit of the invention as well understood by those skilled in the art. Reference therefore will be had to the appended claims for a definition of the limits of the invention.

The invention described herein may be manufactured and used by or for the Government of the United States of America for governmental purposes without the payment of any royalties thereon or therefor.

What is claimed is:

1. An electrical resonator comprising a plurality of fixed wall portions and a plurality of movable wall portions arranged to form a substantially closed resonant cavity structure, means diametrically mounting a pair of said movable wall portions in sliding contact with said fixed wall portions for movement in a first direction parallel to the planes of the fixed wall portions for establishing one dimension of said cavity structure, means mounting another of said movable wall portions in sliding contact with a pair of said fixed wall portions for movement in a direction substantially perpendicular to said first direction to establish another dimension of said cavity structure, means maintaining sliding contact between said another movable wall and said pair of movable wall portions and means responsive to movement of said pair of movable wall portions for moving said another movable wall portion in accordance therewith.

2. An electrical resonator comprising a plurality of wall portions forming a substantially closed three-dimensional resonant cavity structure, means slidably mounting one of said portions for movement relative to the other of said portions in a first direction to establish one dimension of the cavity structure, means slidably mounting another of said portions in quadrature with respect to said one portion for movement relative to the remainder of said other portions and said one portion in a direction different from said first direction to establish another dimension of the cavity structure, means comprising a clutch member operable to selectively move said one portion, and means comprising a cam member associated with said another portion engageable by said one portion for moving said another portion in accordance with movement of said one portion.

3. An electrical cavity resonator structure comprising a first pair of diametrically positioned walls spaced by a third wall determining one dimension of the cavity structure, a second pair of diametrically positioned walls movably mounted in sliding contact with said first pair of walls and said third wall in a direction perpendicular to said first dimension to determine a second dimension of the cavity structure, and a fourth wall mounted in sliding contact with the first pair of walls in a direction perpendicular to said first and said second dimensions to determine a third dimension of the cavity structure, said fourth wall including a pair of surfaces oppositely inclined in the direction of the second dimension to maintain sliding engagement with the second pair of walls.

4. A three-dimensional cavity resonator comprising three fixed wall members forming the bottom and a first pair of opposite sides of said resonator, a pair of oppositely disposed movable wall members slidably engaging said fixed wall members and forming a second pair of opposite sides of said resonator, a third movable wall member forming the top of said resonator, said third movable wall member having inclined portions slidably engaged by said pair of movable wall members, means engaging said movable pair of wall members to vary the space therebetween, thereby simultaneously causing the distance between the movable top and fixed bottom to vary.

5. A three-dimensional cavity resonator substantially parallelepiped in shape comprising three fixed wall members forming the bottom and a first pair of opposite sides of said resonator, a pair of oppositely disposed movable wall members slidably engaging said fixed wall members and forming a second pair of opposite sides of said resonator, a third movable wall member forming the top of said resonator, said third movable wall member having inclined portions slidably engaged by said pair of movable wall members, means engaging said movable pair of wall members to vary the space therebetween, thereby simultaneously causing the distance between the movable top and fixed bottom to vary.

6. A three-dimensional cavity resonator comprising three fixed walls forming the bottom and a first pair of opposite sides of said resonator, a pair of oppositely disposed movable walls slidably engaging said fixed walls and forming a second pair of opposite sides of said resonator, a third movable wall having at least one inclined extension slidably engagable with said pair of oppositely disposed movable walls to form a movable top of said resonator, and means comprising a rotatable member for simultaneously varying the distance between said pair of movable walls in one direction thereby varying the distance between the movable top and fixed bottom in another direction.

7. A three-dimensional cavity resonator substantially parallelepiped in shape comprising three fixed rectangular shaped walls forming the bottom and a first pair of opposite sides of said resonator, a pair of oppositely disposed movable walls slidably engaging said fixed walls and forming a second pair of opposite sides of said resonator, a third movable wall having at least one inclined extension slidably engageable with said pair of oppositely disposed movable walls to form a movable top of said resonator, and means comprising a rotatable member for simultaneously varying the distance between said pair of movable walls in one direction thereby varying the distance between the movable top and fixed bottom in another direction.

8. A three-dimensional cavity resonator comprising three fixed wall elements, a pair of oppositely disposed movable wall elements slidably engaging said fixed wall elements, a third movable wall element slidably engaging said pair of movable wall elements, means comprising a rotatable element for varying the distance between the pair of oppositely disposed movable wall elements in one dimension and means slidably engaging said pair of movable wall elements, said means comprising a cam element associated with said third movable wall element for varying the distance between the third movable wall element and one of said fixed wall elements in a second direction.

ANDREW V. HAEFF.
THURE E. HANLEY.

REFERENCES CITED

The following references are of record in the file of this patent:

UNITED STATES PATENTS

| Number | Name | Date |
| --- | --- | --- |
| 2,158,493 | Brailsford et al. | May 16, 1939 |
| 2,410,109 | Schelleng | Oct. 29, 1946 |
| 2,460,090 | Kannenberg | Jan. 25, 1949 |
| 2,473,777 | Beechlyn | June 21, 1949 |
| 2,514,678 | Southworth | July 11, 1950 |
| 2,567,748 | White | Sept. 11, 1951 |

FOREIGN PATENTS

| Number | Country | Date |
| --- | --- | --- |
| 905,624 | France | Dec. 10, 1945 |